(12) United States Patent
Chou

(10) Patent No.: US 10,217,489 B2
(45) Date of Patent: Feb. 26, 2019

(54) SYSTEMS AND METHODS FOR MEDIA TRACK MANAGEMENT IN A MEDIA EDITING TOOL

(71) Applicant: Cyberlink Corp., Shindian, Taipei (TW)

(72) Inventor: Chen-Wei Chou, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 22 days.

(21) Appl. No.: 15/355,122

(22) Filed: Nov. 18, 2016

(65) Prior Publication Data

US 2017/0162228 A1    Jun. 8, 2017

Related U.S. Application Data

(60) Provisional application No. 62/263,802, filed on Dec. 7, 2015.

(51) Int. Cl.
  *G11B 27/34*    (2006.01)
  *G11B 27/034*   (2006.01)

(52) U.S. Cl.
  CPC ............ *G11B 27/034* (2013.01); *G11B 27/34* (2013.01)

(58) Field of Classification Search
  CPC .................................................. G11B 27/34
  See application file for complete search history.

(56) References Cited

U.S. PATENT DOCUMENTS

| 6,768,499 B2 | 7/2004 | Miller et al. |
| 7,484,201 B2 | 1/2009 | Miyauchi et al. |
| 7,836,389 B2 | 11/2010 | Howard et al. |
| 7,889,975 B2 | 2/2011 | Slone |
| 8,126,312 B2 | 2/2012 | Bushell et al. |
| 8,458,595 B1 | 6/2013 | Margulis |
| 8,543,922 B1 | 9/2013 | Niles et al. |
| 8,612,858 B2 | 12/2013 | Meaney et al. |
| 8,732,221 B2 | 5/2014 | Herberger et al. |
| 8,751,022 B2 | 6/2014 | Eppolito |

(Continued)

FOREIGN PATENT DOCUMENTS

CN          102842325 A      12/2012

OTHER PUBLICATIONS

Fisher, Pawl. "(Video Question)—A simple way to flatten / merge video tracks on to one?" Aug. 10, 2012.

(Continued)

*Primary Examiner* — Mishawn N Hunter
(74) *Attorney, Agent, or Firm* — McClure, Qualey & Rodack, LLP

(57) ABSTRACT

In a media editing device for reorganizing media content and editing the reorganized media content, a plurality of tracks is obtained, where each track comprises at least one component, each component comprising at least one segment, each segment comprising one of: image content, video content, audio content, and audio/video content. A first user input selecting a plurality of the tracks is received. A second user input selecting at least one reorganization technique to be applied to the selected tracks is also received. The selected reorganization technique is applied to the selected tracks, and the reorganized tracks are displayed. Editing operations are received for at least one of the reorganized tracks.

21 Claims, 13 Drawing Sheets

(56) References Cited

U.S. PATENT DOCUMENTS

| | | | |
|---|---|---|---|
| 8,769,421 | B2 | 7/2014 | Meaney et al. |
| 8,818,173 | B2 | 8/2014 | Wallace |
| 8,819,557 | B2 | 8/2014 | Matsuda et al. |
| 8,856,655 | B2 | 10/2014 | Pendergast et al. |
| 9,111,579 | B2 | 8/2015 | Meaney et al. |
| 2002/0059349 | A1* | 5/2002 | Wakita ............ G11B 27/034 715/255 |
| 2002/0147728 | A1* | 10/2002 | Goodman ............ G06F 3/0482 |
| 2003/0002851 | A1 | 1/2003 | Hsiao et al. |
| 2004/0125124 | A1* | 7/2004 | Kim ............ G06F 17/30799 715/716 |
| 2008/0044155 | A1 | 2/2008 | Kuspa |
| 2008/0263433 | A1 | 10/2008 | Eppolito et al. |
| 2009/0049371 | A1* | 2/2009 | Keng ............ G06F 17/30026 715/202 |
| 2010/0183280 | A1 | 7/2010 | Beauregard et al. |
| 2010/0223128 | A1 | 9/2010 | Dukellis et al. |
| 2010/0251291 | A1* | 9/2010 | Pino, Jr. ............ H04N 5/445 725/34 |
| 2011/0314061 | A1* | 12/2011 | Lara ............ G06Q 30/00 707/780 |
| 2012/0174010 | A1 | 7/2012 | Flint et al. |
| 2013/0145268 | A1 | 6/2013 | Kukulski |
| 2013/0195427 | A1 | 8/2013 | Sathish |
| 2013/0263003 | A1 | 10/2013 | Joseph et al. |
| 2015/0234850 | A1 | 8/2015 | Brown, Jr. |
| 2016/0093331 | A1* | 3/2016 | Deng ............ G11B 27/031 386/282 |

OTHER PUBLICATIONS

Adobe Community. "Collapsing two layer project to one video layer?" Aug. 5, 2010.

Austin, Charlie. "Don't Fight the Magnetic Timeline!" https://library.creativecow.net/austin_charlie/FCPX-Timeline/1 (Printed on Nov. 17, 2016).

Cutting with the Vegas Pro Multi-Camera Editing Tools, http://www.vegascreativesoftware.com/us/?utm_source=sonycreativesoftware&utm_medium=referral&utm_campaign=redirect&cnt=_cutting_with_the_vegas_pro_multi-camera_editing_tools&cat=Blog&lang=en (Printed on Nov. 17, 2016).

Peters, Oliver. "Avid Media Composer Power Tips" DigitalFilms a blog by Oliver Peters, Jun. 14, 2013.

Davinci Resolve 12 Edit, https://www.blackmagicdesign.com/in/products/davinciresolve/edit (Printed on Nov. 17, 2016).

Final Cut Pro 7 User Manual, https://documentation.apple.com/en/finalcutpro/usermanual/index.html#chapter=34%26section=1%26tasks=true (Printed on Nov. 17, 2016).

Taylor, Richard. "Tutorial: Final Cut Pro X: Track Based Editing" Los Angeles Creative Pro User Group, Jul. 2012.

Peters, Oliver. "Compositing with Avid Media Composer" Digitalfilms a blog by Oliver Peters. May 10, 2009.

* cited by examiner

SYSTEMS AND METHODS FOR MEDIA TRACK MANAGEMENT IN A MEDIA EDITING TOOL

CROSS-REFERENCE TO RELATED APPLICATION

This application claims priority to, and the benefit of, U.S. Provisional Patent Application entitled, "Systems and Methods for Media Track Management in a Media Editing Tool," having Ser. No. 62/263,802, filed on Dec. 7, 2015, which is incorporated by reference in its entirety.

TECHNICAL FIELD

The present disclosure generally relates to multimedia content and more particularly, to systems and methods for media track management.

BACKGROUND

As smartphones and other mobile devices have become ubiquitous, people have the ability to take pictures virtually any time. Furthermore, with an ever-growing amount of content available to consumers through the Internet and other sources, consumers have access to a vast amount of digital content. With existing media editing tools, users can manually edit digital images to achieve a desired effect or style. However, while many media editing tools are readily available, the editing process can at times be complex and time-consuming for the casual user when processing a large volume of content.

SUMMARY

Briefly described, one embodiment, among others, is a method implemented in a media editing device for reorganizing media content and editing the reorganized media content. A plurality of tracks is obtained, where each track comprises at least one component, each component comprising at least one segment, each segment comprising one of: image content, video content, audio content, and audio/video content. A first user input selecting a plurality of the tracks is received. A second user input selecting at least one reorganization technique to be applied to the selected tracks is also received. The selected reorganization technique is applied to the selected tracks, and the reorganized tracks are displayed. Editing operations are received for at least one of the reorganized tracks.

Another embodiment is a system that comprises a memory storing instructions and a processor coupled to the memory. The processor is configured by the instructions to obtain a plurality of tracks, each track comprising at least one component, each component comprising at least one segment, each segment comprising one of: image content, video content, audio content, and audio/video content. The processor is further configured by the instructions to receive a first user input selecting a plurality of the tracks and receive a second user input selecting at least one reorganization technique to be applied to the selected tracks. The processor is further configured by the instructions to apply the selected reorganization technique to the selected tracks and display the reorganized tracks. The processor is further configured by the instructions to receive editing operations for at least one of the reorganized tracks.

Another embodiment is a non-transitory computer-readable storage medium storing instructions to be implemented by a computing device having a processor. The processor, when executing the instructions, cause the computing device to obtain a plurality of tracks, each track comprising at least one component, each component comprising at least one segment, each segment comprising one of: image content, video content, audio content, and audio/video content. The processor, when executing the instructions, further causes the computing device to receive a first user input selecting a plurality of the tracks and receive a second user input selecting at least one reorganization technique to be applied to the selected tracks. The processor, when executing the instructions, further causes the computing device to apply the selected reorganization technique to the selected tracks and display the reorganized tracks. The processor, when executing the instructions, further causes the computing device to receive editing operations for at least one of the reorganized tracks.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for systems and methods for performing media track management to facilitate selection of media tracks for editing purposes. With the proliferation of smartphones, users are readily able to capture images and/or video clips anywhere and anytime. As time passes, the library of captured media content grows. As can be appreciated, it can become increasingly difficult to manage and identify tracks for editing purposes as the volume of media content and the number of media tracks grows. The disclosed media management system allows users to sort, merge, and arrange a large number of tracks in a media editing tool.

In the context of this disclosure, a media track generally refers to a combination of one or more components where each component may further comprise one or more segments. Each segment may comprise audio-only content, video-only content, image content, or audio-video content, where each component may contain one or more segments. In some instances, each component initially contains a single segment at the beginning of the editing phase. After the user merges multiple components into a single component, the newly formed single component may then comprise multiple segments.

Figure 1:
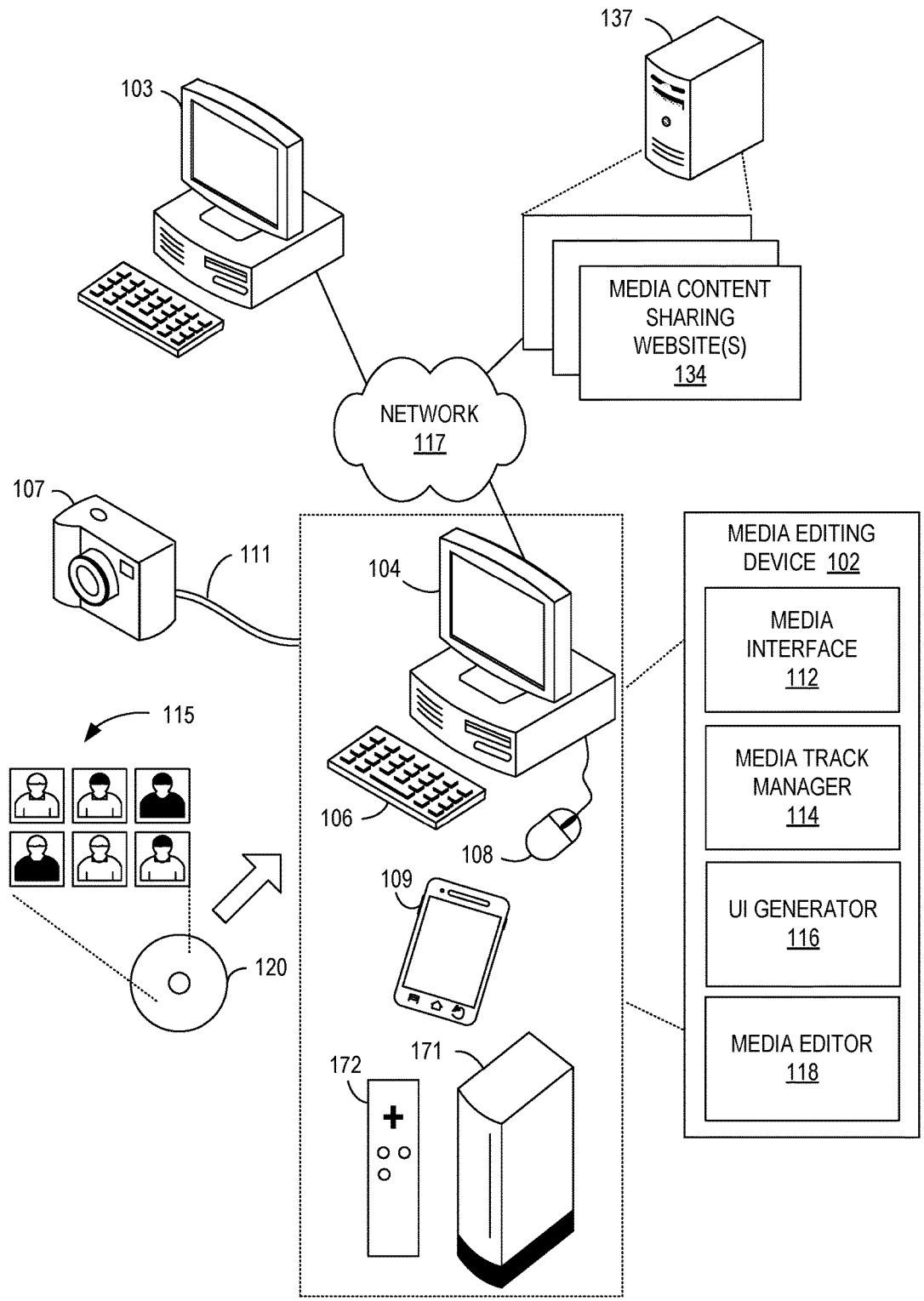
FIG. 1 is a block diagram of a media editing device in accordance with various embodiments.

A description of a track management system for facilitating multimedia editing is now described followed by a discussion of the operation of the components within the system. FIG. 1 is a block diagram of a media editing device 102 in which the track reorganization techniques disclosed herein may be implemented. In the context of this disclosure, reorganization of tracks can refer to the reordering, merging, and/or restructuring of tracks for facilitating access to a large number of tracks for media editing purposes.

The media editing device 102 may be embodied as a computing device equipped with digital content recording capabilities such as, but not limited to, a digital camera, a smartphone, a tablet computing device, a digital video recorder, a laptop computer coupled to a webcam, and so on. The media editing device 102 is configured to retrieve, via a media interface 112, digital media content 115 stored on a storage medium 120 such as, by way of example and without limitation, a compact disc (CD) or a universal serial bus (USB) flash drive, wherein the digital media content 115 may then be stored locally on a hard drive of the media editing device 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

The digital media content 115 may be encoded in other formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

The media interface 112 in the media editing device 102 may also be configured to retrieve digital media content 115 directly from a digital recording device 107 where a cable 111 or other interface can be used for coupling the digital recording device 107 to the media editing device 102. The media editing device 102 may support any one of a number of common computer interfaces, such as, but not limited to IEEE-1394 High Performance Serial Bus (Firewire), USB, a serial connection, and a parallel connection.

The digital recording device 107 may also be coupled to the media editing device 102 over a wireless connection or other communication path. The media editing device 102 may be coupled to a network 117 such as, for example, the Internet, intranets, extranets, wide area networks (WANs), local area networks (LANs), wired networks, wireless networks, or other suitable networks, etc., or any combination of two or more such networks. Through the network 117, the media editing device 102 may receive digital media content 115 from another computing system 103. Alternatively, the media editing device 102 may access one or more media content sharing websites 134 hosted on a server 137 via the network 117 to retrieve digital media content 115.

A media track manager 114 executes on a processor of the media editing device 102 and configures the processor to perform various operations/functions relating to management of multimedia tracks. For example, the media editing device 102 may be configured to sort tracks based on the number of multimedia components in the tracks. The media track manager 114 may also be configured to group or merge multiple components to form a new component, where the components originate from a common track or where the components span different tracks.

The media track manager 114 may be further configured to place the grouped components into an available time slot within one of the tracks, or if necessary, create a new track for the grouped components. The media track manager 114 may be configured to move components from one track to another in order to reduce the overall number of tracks. The media track manager 114 may also be configured to ungroup or partition a component into multiple components.

The UI generator 116 is executed to generate a user interface for allowing a user to view and organize media tracks comprising one or more media components. The user interface allows the user to specify such user input as the selection of tracks and the selection of one or more reorganization techniques to be applied to the selected tracks. The user interface also allows the user to specify whether to reorganize additional tracks when a first reorganization operation has been performed. The reorganized tracks are displayed in the user interface, and the user can then elect to further reorganize tracks or apply editing operations to various tracks. Examples of various user interfaces generated by the UI generator 116 are described later.

The media editor 118 is executed to obtain input from a user and perform editing operations on the organized media tracks. The user input can be obtained by the media editor 118 via selection or manipulation of UI components in an editing toolbar. The media editing operations may comprise such operations as trimming, cropping, cutting, and so on.

Figure 2:
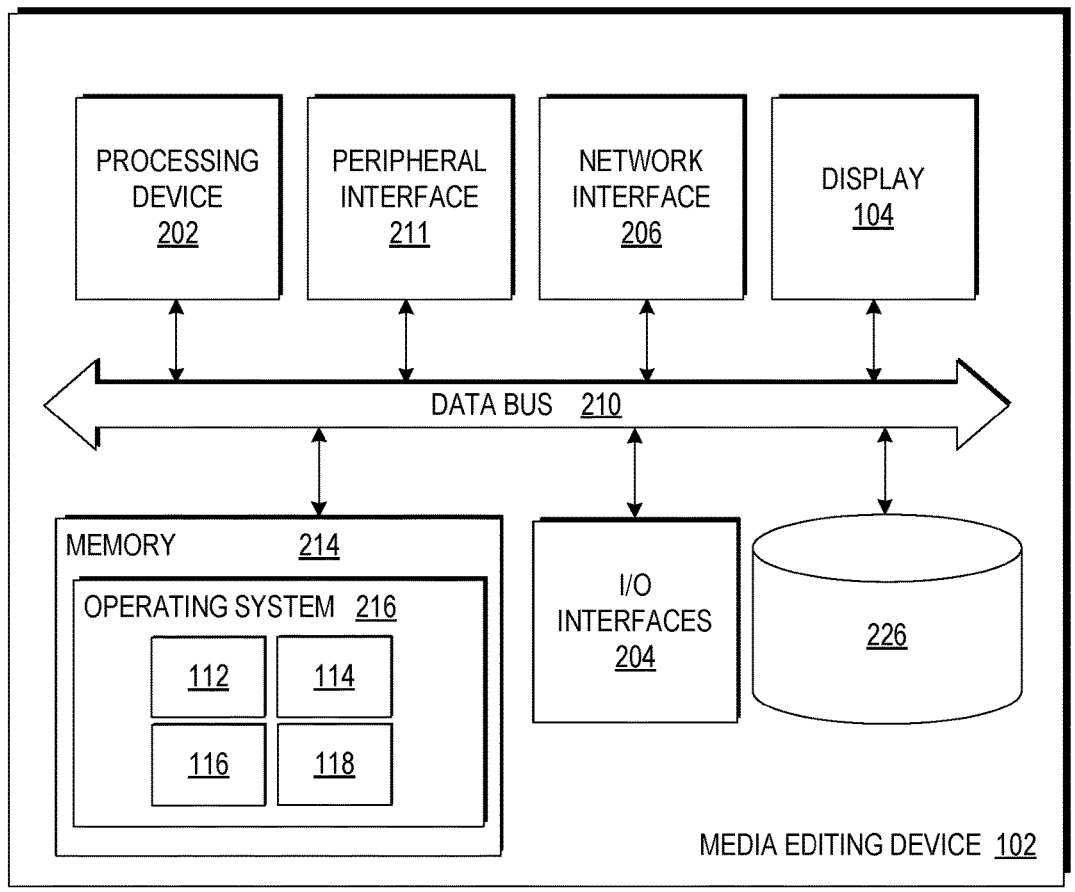
FIG. 2 illustrates a schematic block diagram of the media editing device in FIG. 1 in accordance with various embodiments.

FIG. 2 illustrates a schematic block diagram of the media editing device 102 in FIG. 1. The media editing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, each of the media editing device 102 comprises memory 214, a processing device 202, a number of input/output interfaces 204, a network interface 206, a display 104, a peripheral interface 211, and mass storage 226, wherein each of these components are connected across a local data bus 210.

The processing device 202 may include any custom made or commercially available processor, a central processing unit (CPU) or an auxiliary processor among several processors associated with the media editing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the media editing device 102 depicted in FIG. 1. In accordance with such embodiments, the components are stored in memory 214 and executed by the processing device 202, thereby causing the processing device 202 to perform the operations/functions relating to track management disclosed herein. One of ordinary skill in the art will appreciate that the memory 214 can, and typically will, comprise other components which have been omitted for purposes of brevity.

Input/output interfaces 204 provide any number of interfaces for the input and output of data. For example, where the media editing device 102 comprises a personal computer, these components may interface with one or more user input/output interfaces 204, which may comprise a keyboard or a mouse, as shown in FIG. 2. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
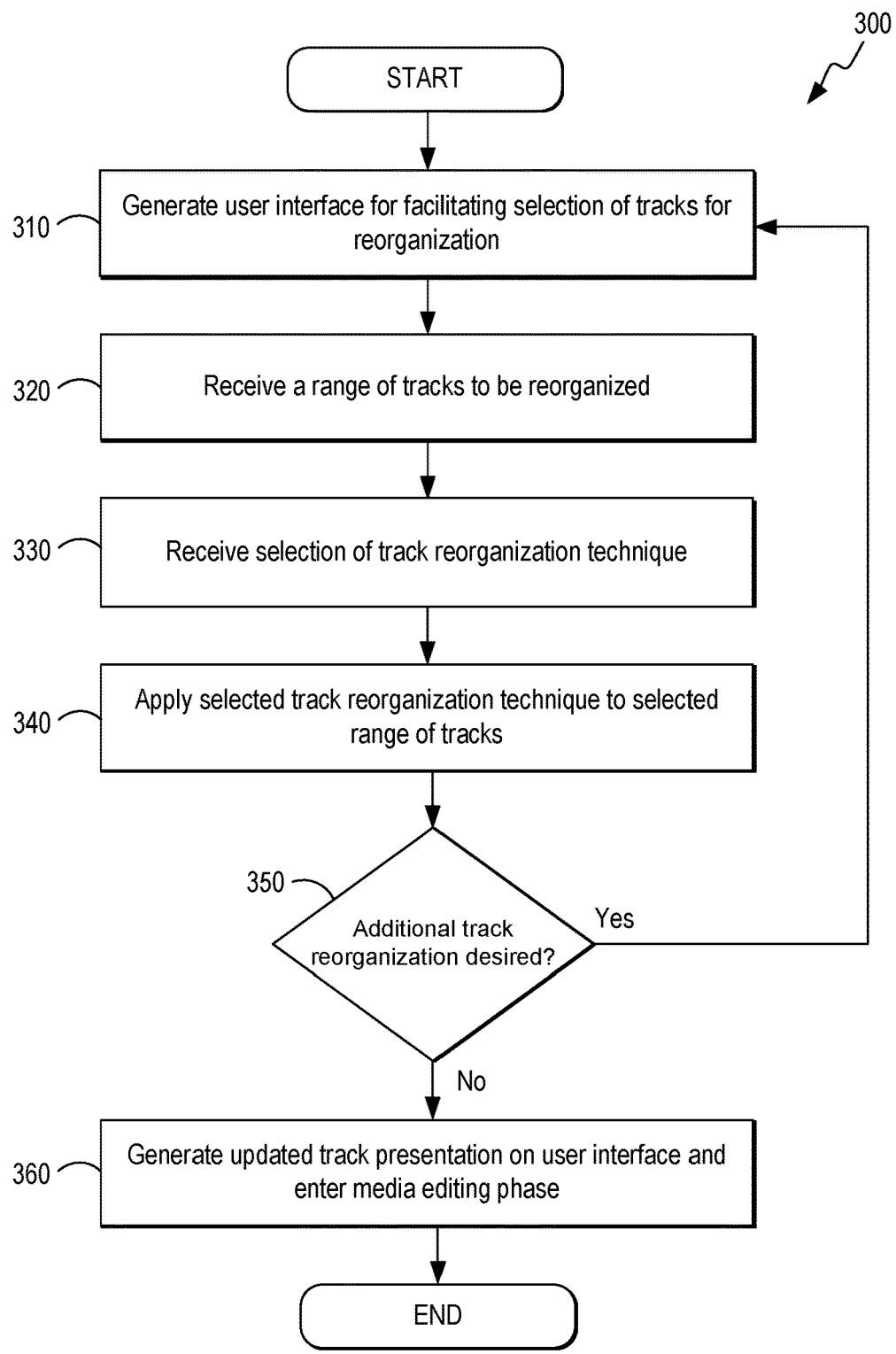
FIG. 3 is a flowchart for implementing a track management system for facilitating multimedia editing performed by the media editing device of FIG. 1 in accordance with various embodiments.

Reference is made to FIG. 3, which is a flowchart 300 in accordance with various embodiments for implementing a track management system for facilitating multimedia editing performed by the media editing device 102 of FIG. 1. It is understood that the flowchart 300 of FIG. 3 provides merely an example of the different types of functional arrangements that may be employed to implement the operation of the various components of the media editing device 102. As an alternative, the flowchart 300 of FIG. 3 may be viewed as depicting an example of steps of a method implemented in the media editing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the media editing device 102 generates a user interface that displays tracks for allowing the user to select a plurality of tracks to be reorganized by the media editing device 102. The user interface also displays a selection component/tool for allowing the user to select a track reorganization technique that the user wishes to apply to the selected range of tracks. Reorganization of the tracks may comprise, for example, reordering the tracks in the user interface according to the number components in each respective track and/or grouping multiple components into a new component. Note that the components can originate from a common track or originate from multiple tracks. Reorganization of the tracks may also comprise placing the grouped components into an available time slice within one of the tracks and/or moving components from one track to another in order to reduce the overall number of tracks. As yet another example, reorganization of the tracks may also comprise ungrouping or partitioning a component into multiple components.

At block 320, the media editing device 102 receives user input specifying one or more tracks to be reorganized. At block 330, the media editing device 102 receives user input specifying the track reorganization technique that the user wishes to apply to the selected range of tracks (as described further below in connection with FIGS. 4B and 4C), where the selected technique is applied to the selected range of tracks. As described below, the user is not limited to applying a single reorganization technique as multiple reorganization techniques may be applied to the selected tracks. At block 340, the selected track reorganization technique is applied to the range of tracks selected by the user.

At decision block 350, a determination is made on whether any additional tracks are to be reorganized. In some instances, the user may specify which additional tracks are to be reorganized. In other instances, the media editing device 102 may automatically reorganize additional tracks for purposes of reducing the overall number tracks, thereby further facilitating the media editing process. The additional tracks may comprise tracks that are different than the tracks previously selected by the user. However, the user may also reorganize some or all of the previously selected tracks. As illustrated in various figures (as described further below in connection with FIG. 4A), the user can simply select tracks by clicking on or manipulating a selection box or other selection component in the user interface. Determining whether additional tracks are to be reorganized can comprise prompting the user once the previously selected tracks have been reorganized and evaluating the user's response. If the user wishes to reorganize additional tracks, then the process returns to block 310 where an updated user interface is generated for facilitating selection of tracks to be reorganized.

At decision block 350, if the user does not wish to reorganize any additional tracks, then the process proceeds to block 360, where the user interface is updated to reflect the reorganized tracks. The media editing device 102 then enters the media editing stage based on the reorganized tracks whereby the user can modify/edit one or more of the tracks. Thereafter, the process shown in FIG. 3 ends.

Figure 4A:
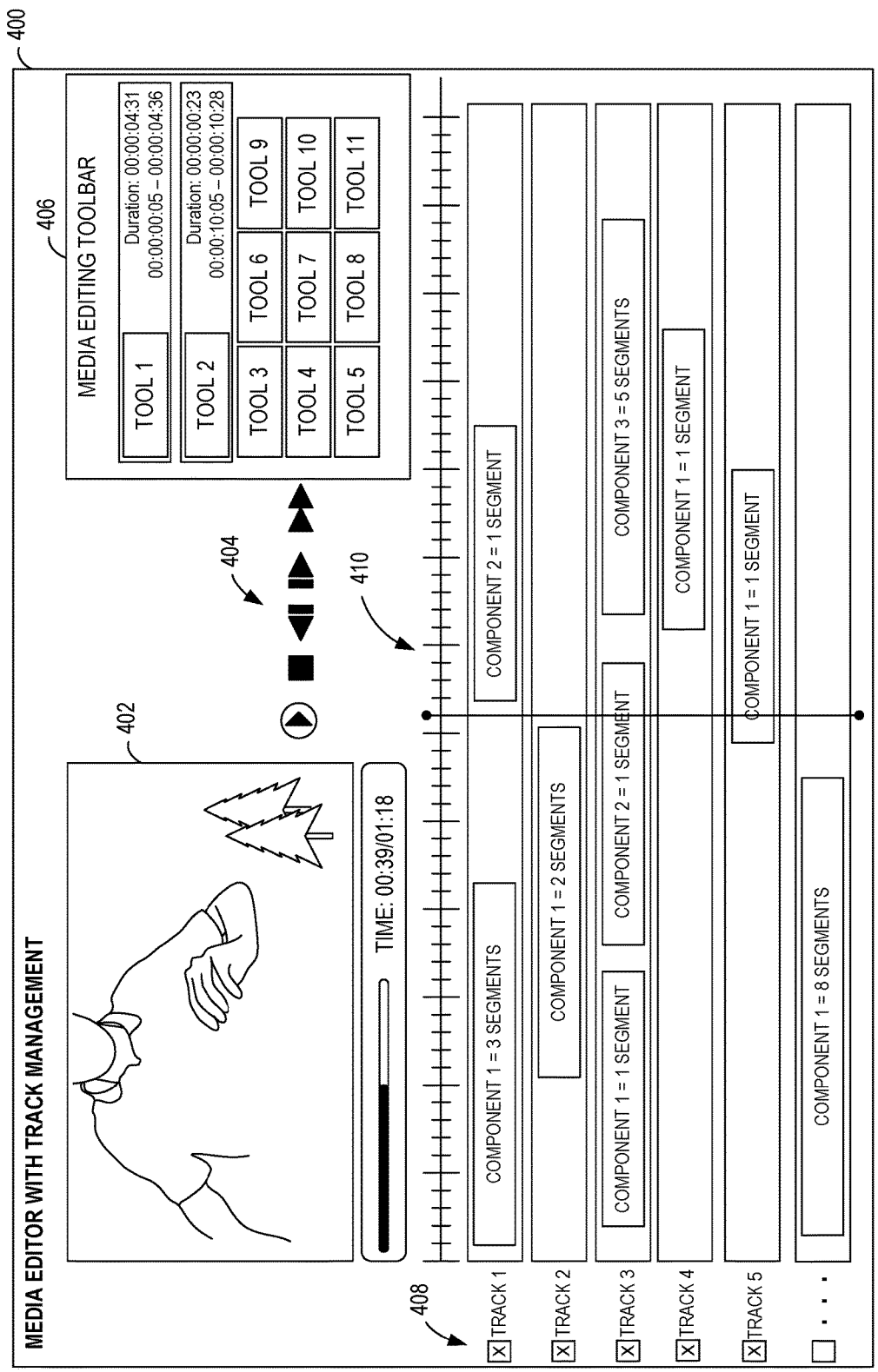
FIGS. 4A, 4B, and 4C illustrate an example user interface for selecting tracks to be rearranged based on one or more selected reorganization techniques in accordance with various embodiments.

To illustrate various features relating to the user interface discussed above for facilitating media track management, reference is made to FIG. 4A, which is an example user interface 400 generated by the UI generator 116 in accordance with various embodiments. In some embodiments, the user interface 400 may include a preview window 402 and playback controls 404 for viewing a selected track. The preview window 402 allows the window to view selected media content prior to and after media editing effects have been applied. Also shown is a timeline representation 410 where the various tracks span the timeline representation 410.

The user interface 400 also includes a media editing toolbar 406 comprising various editing tools that may be utilized upon organization of the various media tracks. The user interface 400 comprises various tracks with each track comprising one or more media components. Assume for purposes of illustration that each component (e.g., Component 1, Component 2) comprises one or more segments, as shown in FIG. 4A. The user interface 400 also includes selection components 408 that allow the user to select one or more of the media tracks to be reorganized. The user has selected tracks 1-5 (as denoted by the "x" in each of the selection boxes). In this scenario, the user has selected tracks 1-5 for purposes of editing these tracks using the media editing toolbar 406.

Figure 4B:
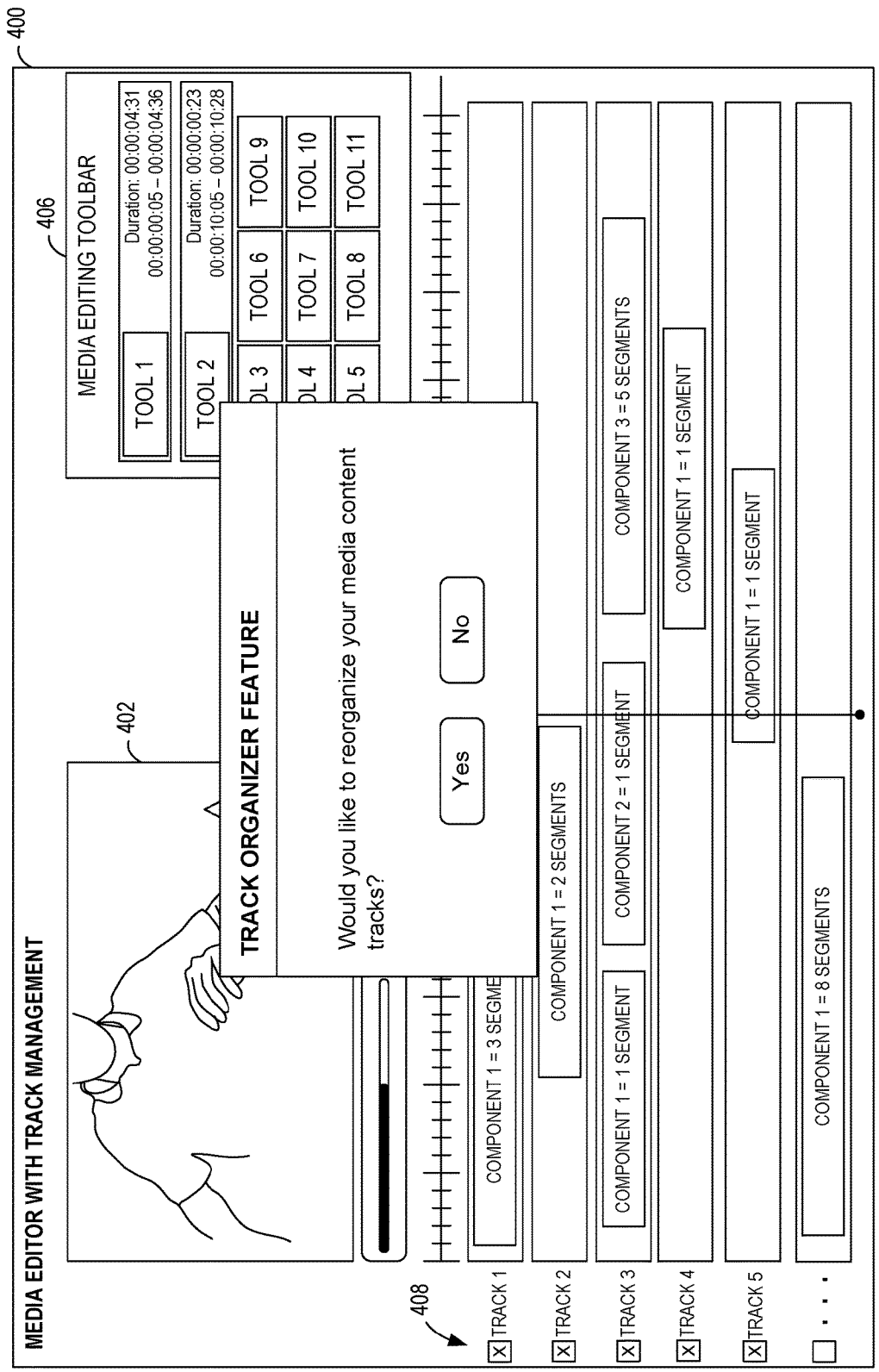

FIG. 4B illustrates a user interface 400 generated by the UI generator 116 where the media track manager 114 (FIG. 1) prompts the user to specify whether the user wishes to reorganize the selected tracks (tracks 1-5), thereby facilitating the media editing process. In some instances, the media track manager 114 may automatically prompt the user when the user selects a predetermined number of tracks (e.g., 20 tracks). In other instances, the media track manager 114 may automatically prompt the user based on the total number of segments associated with the components found in the selected tracks. That is, the media track manager 114 may prompt the user when the total number of segments reaches or exceeds a predetermined number of segments.

Figure 4C:
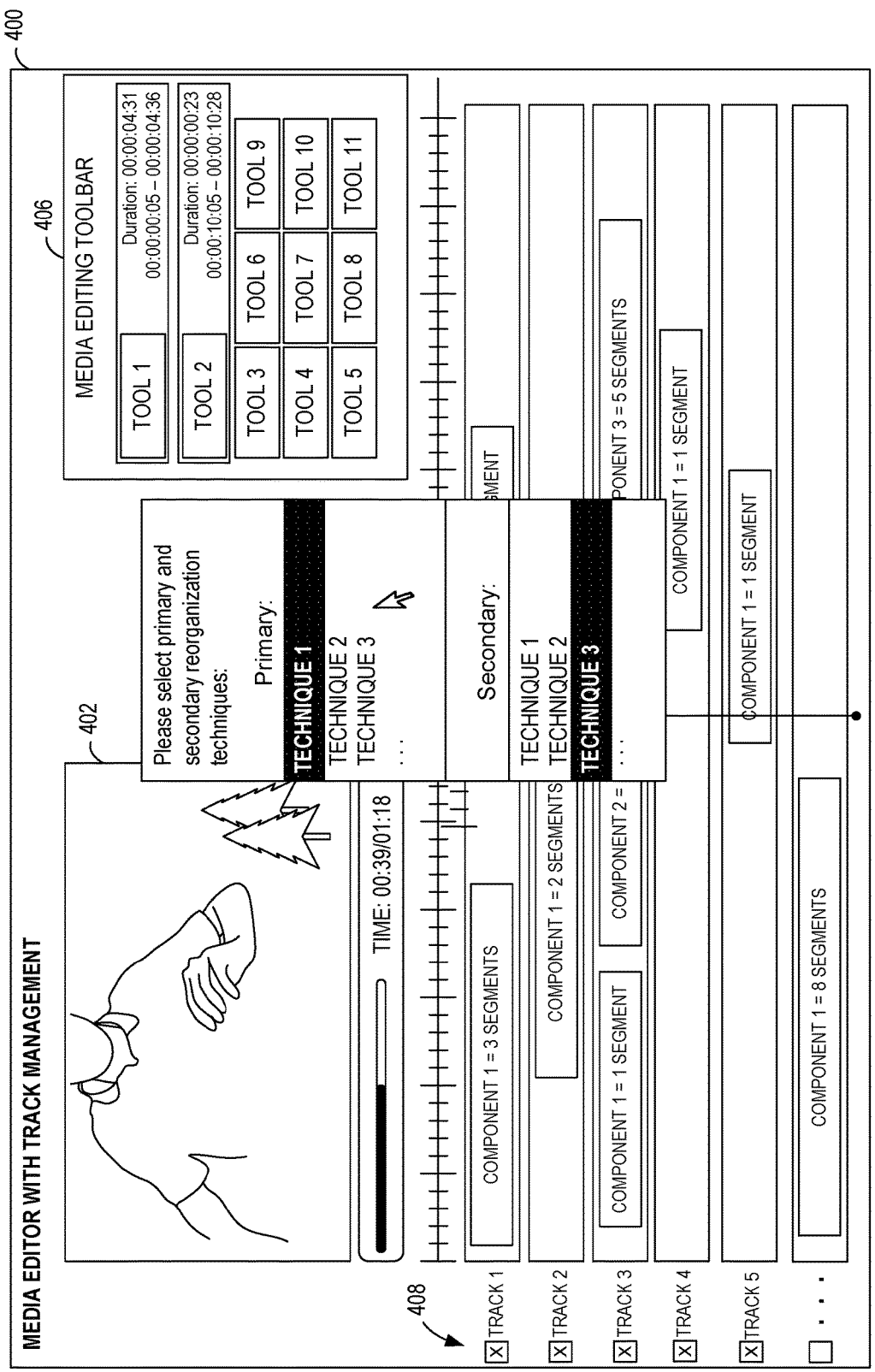

FIG. 4C illustrates a user interface 400 for allowing the user to specify one or more reorganization techniques. In the example shown, the user has selected tracks 1-5 (as denoted by the "x" in each of the selection boxes). In some instances, the user interface 400 may provide a selection component that allows the user to specify both a primary reorganization technique and a secondary reorganization technique to be applied to tracks 1-5. For example, the primary reorganization technique may comprise a merging operation while the secondary reorganization may comprise rearranging of the tracks. Note that the selection component is not limited to a primary and secondary reorganization technique and additional reorganization techniques may be selected by the user. For instances where the user selects multiple reorganization techniques, the primary reorganization technique has the highest priority, the secondary reorganization technique has the next highest priority, and so on.

Figure 5A:
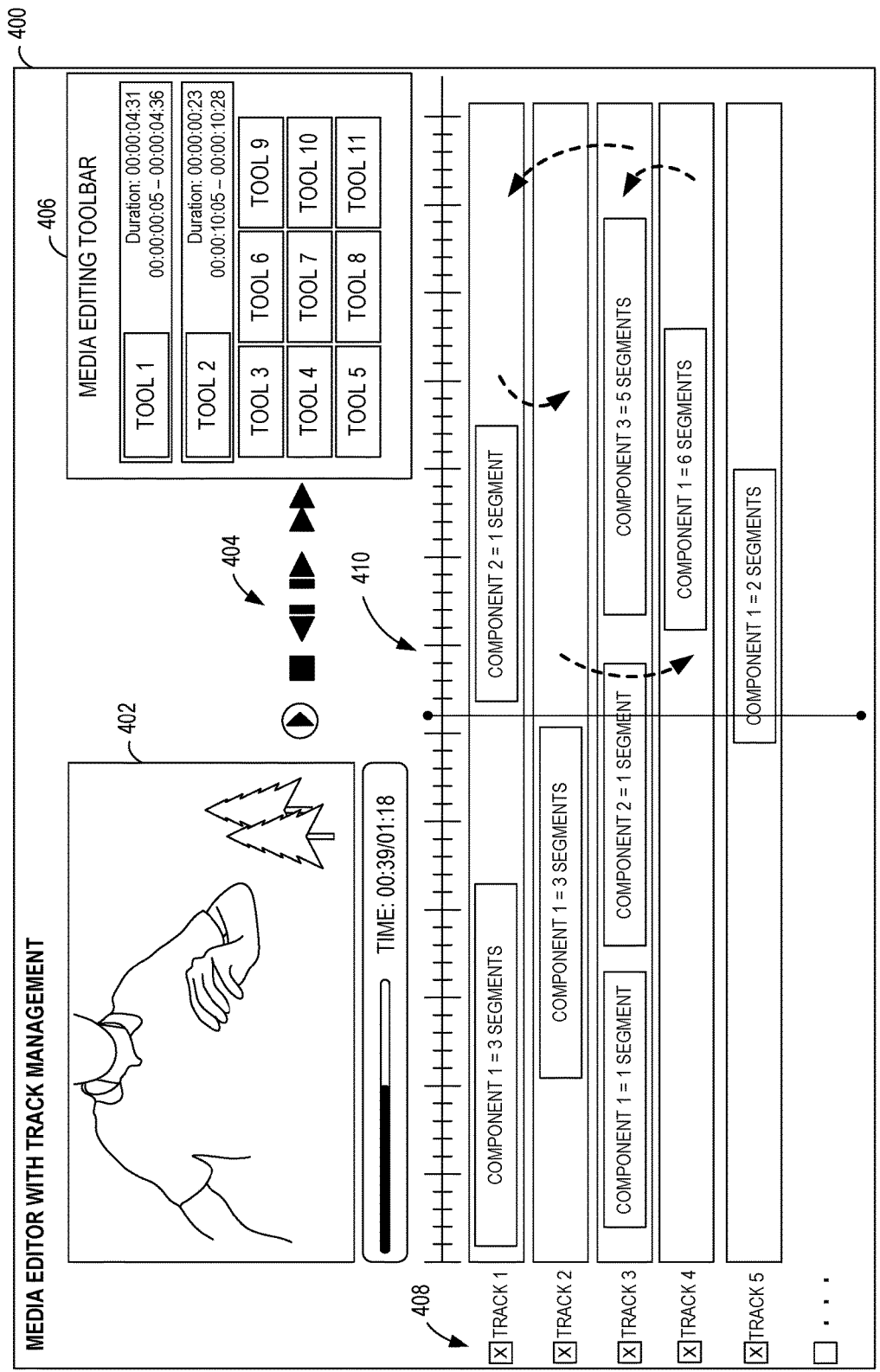
FIGS. 5A and 5B illustrate an example whereby a grouping of selected tracks is sorted based on the number of components in each track in accordance with various embodiments.

FIG. 5A illustrates an example of a reorganization technique comprising a sorting operation where the selected tracks are sorted based on the number of components in each track. In the example shown, assume that the user has selected tracks 1 to 5 to be reorganized where the selected tracks each comprise one or more components and where each component may further comprise one or more segments. The user then selects one of the reorganization techniques (i.e., a sorting operation in the example of FIG. 5A).

Figure 5B:
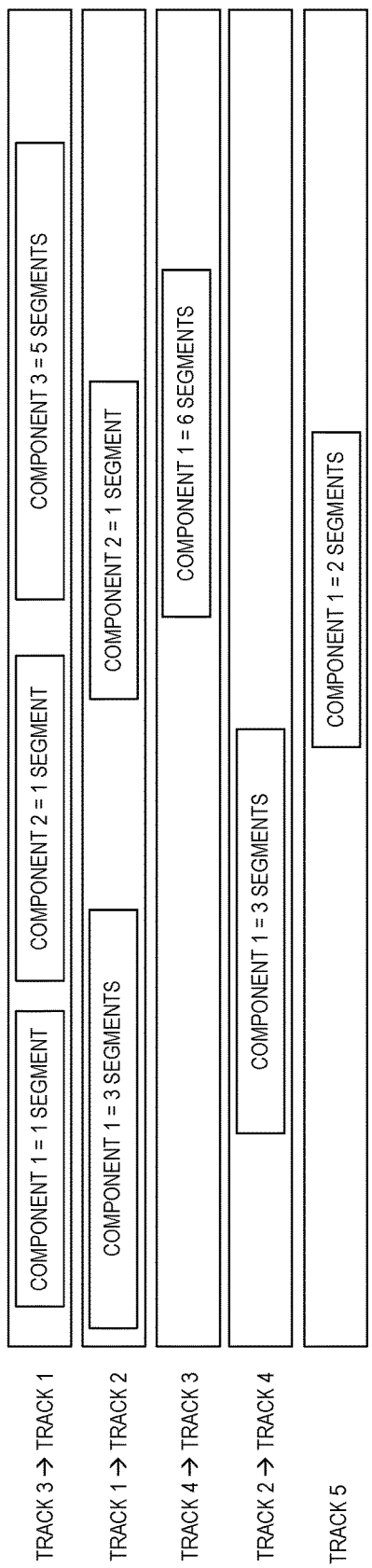

As shown, the order of the tracks is rearranged based on the number of components in each respective track so that the tracks are sorted in descending order, such that the track with the largest number of components is displayed in the top track (track 1), followed by the track with the second largest number of components (relocated to track 2). That is, as shown in FIG. 5B, after applying the sorting operation, the tracks are reorganized such that the tracks are displayed in the following order starting from the top: track 3 (having 3 components), track 1 (having 2 components), track 4 (having 1 component with 6 segments), track 2 (having 1 component with 3 segments), and track 5 (having 1 component with 2 segments). Specifically, as shown in FIG. 5B, track 3 is relocated to the top position previously occupied by original track 1. Track 1 is relocated to the second position previously occupied by original track 2. Track 4 is relocated to the second position previously occupied by original track 3. Track 2 is relocated to the second position previously occupied by original track 4. The position of track 5 remains the same.

Note that as shown in the sorting operation in FIG. 5B, while the tracks are sorted based on the number of components, a secondary sort criteria may be applied for instances where two or more tracks share the same number of components (e.g., original tracks 2, 4, and 5). The secondary sort criteria may correspond to the overall number of segments. For example, if two tracks contain the same number of components, the track with the larger overall number of segments will take precedence over the other track.

Figure 6A:
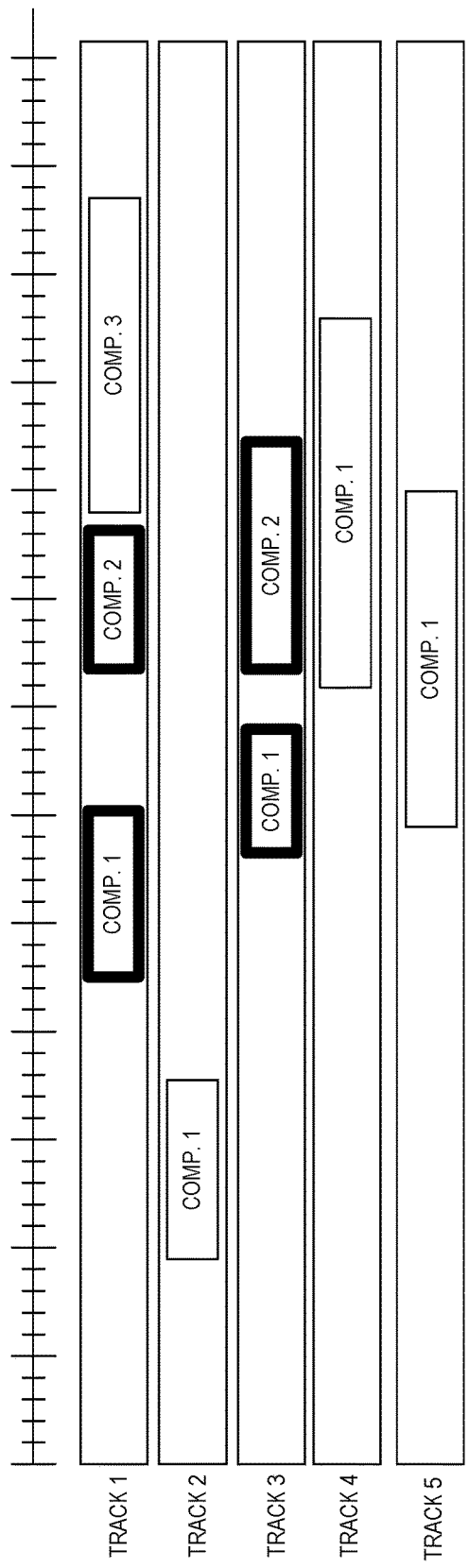
FIG. 6A illustrates an example user interface whereby components from selected tracks are grouped together to create a new component in accordance with various embodiments.

FIG. 6A illustrates a grouping/merging operation where the components from selected tracks are grouped together to create a new component. For some embodiments, when the user selects at least two components, the corresponding tracks are automatically selected. The user then selects one of the reorganization techniques to be applied to the selected tracks (i.e., a grouping operation in the example of FIG. 6A). This reorganization technique can be useful when the user wishes to group various video and audio components together for editing purposes. The newly created component may be moved to another track, trimmed, cropped, resampled, lengthened, shortened, and so on. In the example shown, the user wishes to group components 1 and 2 in track 1 with components 1 and 2 in track 3.

Figure 6B:
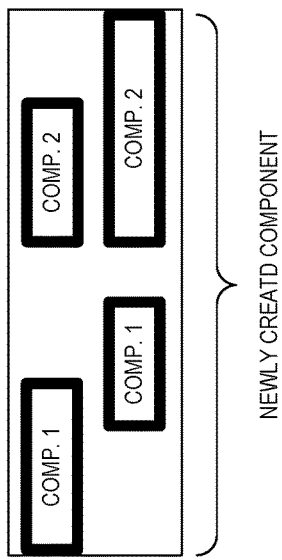
FIG. 6B illustrates the newly created component with the selected components grouped together in accordance with various embodiments.
Figure 6C:
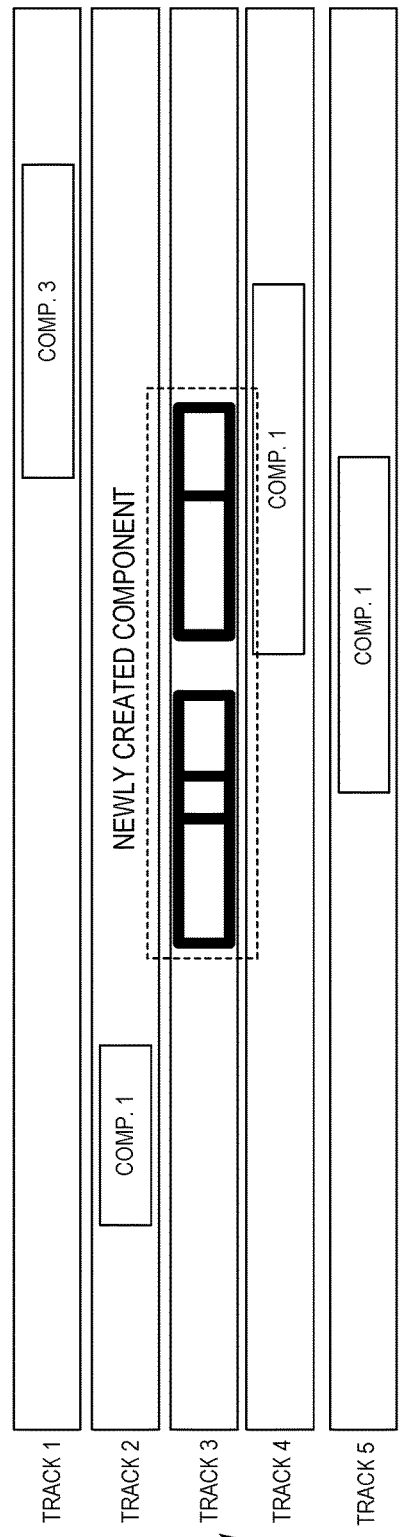
FIG. 6C illustrates placement of the newly created component of FIG. 7 in one of the tracks in accordance with various embodiments.

FIG. 6B illustrates generation of a newly created component with the selected components grouped together. Note that the original timing information associated with each component is preserved. FIG. 6C illustrates placement of the newly created component into one of the tracks where one or more of the grouped components originated. The duration of the newly created component is defined by the earliest start time and the latest end time among the selected components. Referring back briefly to FIG. 6A, the duration of the newly created component will be defined by the start time of component 1 in track 1 and the end time of component 2 in track 3.

With reference back to FIG. 6C, the newly created component is inserted into track 3 as track 3 does not have any components that overlap in time with the newly created component and is therefore able to accommodate the newly created component. On the other hand, track 1 (where component 1 and component 2 originated) is not able to accommodate the newly created component due to a portion of component 3 overlapping in time with the newly created component. In the event that the media track manager 114 is not able to locate a track that can accommodate the newly created component, the media track manager 114 generates a new track with the newly created component.

Figure 7:
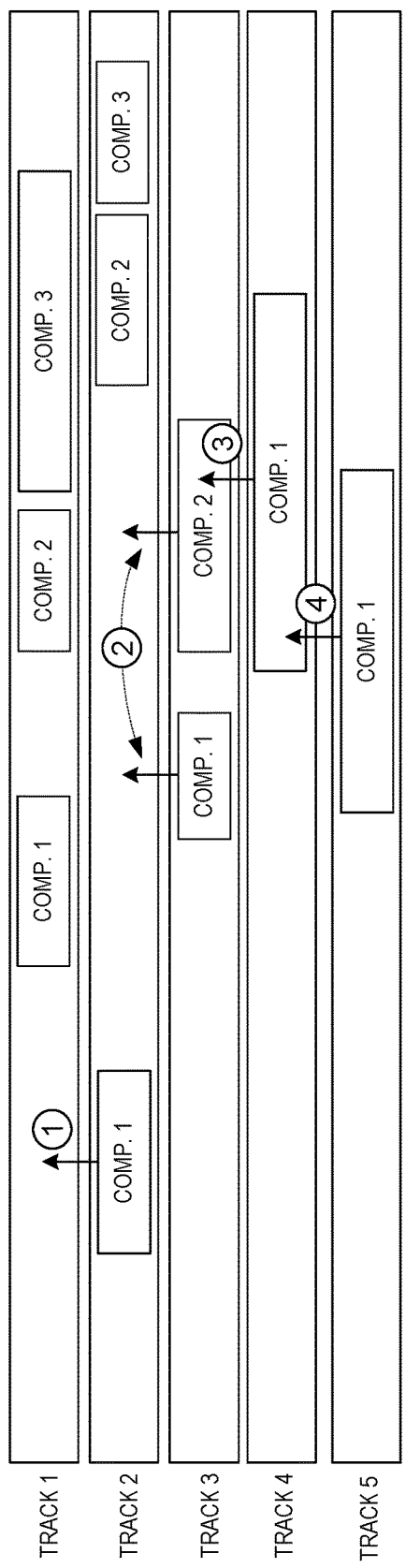
FIG. 7 illustrates a merging operation where components are relocated to other tracks based on available space in accordance with various embodiments.

FIG. 7 illustrates a reorganization technique comprising a moving operation where components are relocated to other tracks based on available time slots. Specifically, the media track manager 114 (FIG. 1) first analyzes the timing relationship among components in a selected group of tracks.

Based on the timing relationship, the media track manager 114 identifies tracks that can accommodate components from lower numbered tracks. In the example shown, assume that the selected tracks (tracks 1 to 5) have already undergone a first reorganization operation performed by the media track manager 114 where tracks are sorted according to the number of components.

Next, the media track manager 114 determines that various components can be moved into other higher ordered tracks. For example, the media track manager 114 determines that track 1 has an available time slot that can accommodate component 1 in track 2. Similarly, the media track manager 114 determines that track 2 has available time slots that can accommodate components 1 and 2 in track 3. Note that due to insertion of components 1 and 2 from track 3 into track 2, space becomes available in track 3, thereby allowing component 1 in track 4 to be inserted into the time slot previously occupied by component 2 in track 3. Similarly, due to insertion of component 1 in track 4 into track 3, space becomes available in track 4, thereby allowing component 1 in track 5 to be inserted into the time slot previously occupied by component 1 in track 4. Thus, the reorganization technique illustrated in FIG. 7 achieves a technical effect of reducing the overall number of tracks, thereby simplifying the media editing process.

Figure 8:
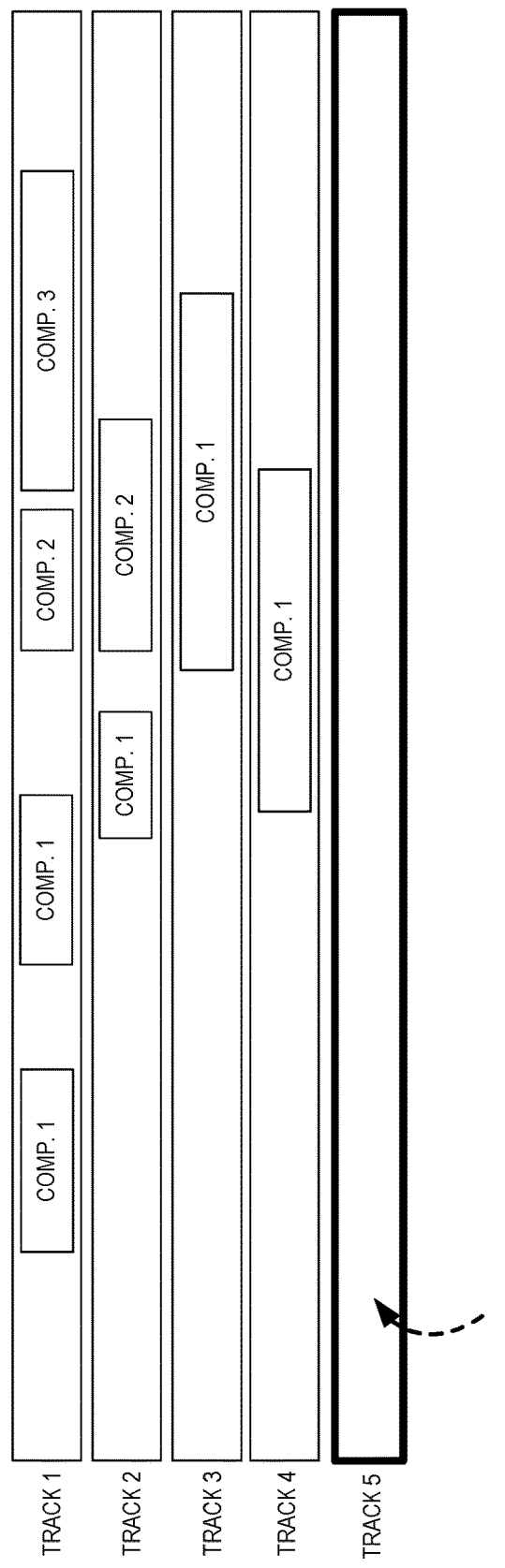
FIG. 8 illustrates a reduction in the number tracks upon application of a merging operation in accordance with various embodiments.

With reference to FIG. 8, as a result of insertion of component 1 in track 5 into track 4, track 5 has no remaining components. The user interface 400 may optionally include a component that allows the user to delete the empty track (track 5). Note that this is based on the assumption that only tracks 1 and 5 have been selected to undergo the merging operation and that no components in track 6 are inserted into track 5. As track 5 has no components, this track is removed by the media track manager 114 (FIG. 1), thereby reducing the overall number of tracks.

In some instances, the user may later wish to ungroup a newly created component into its original components. In accordance with various embodiments, the media track manager 114 is configured to perform an ungrouping operation on a newly created component comprising a plurality of components. Note that the media track manager 114 may be configured to perform the ungrouping operation even if the newly created component has been modified, where the modification may correspond to the component being effect-edited, shortened, slow-motioned, trimmed, sharpened, auto-lighting, cropped, and so on. The media track manager 114 accomplishes this by preserving information relating to each of the components that were grouped together, where such information may include content and timing information.

Figure 9:
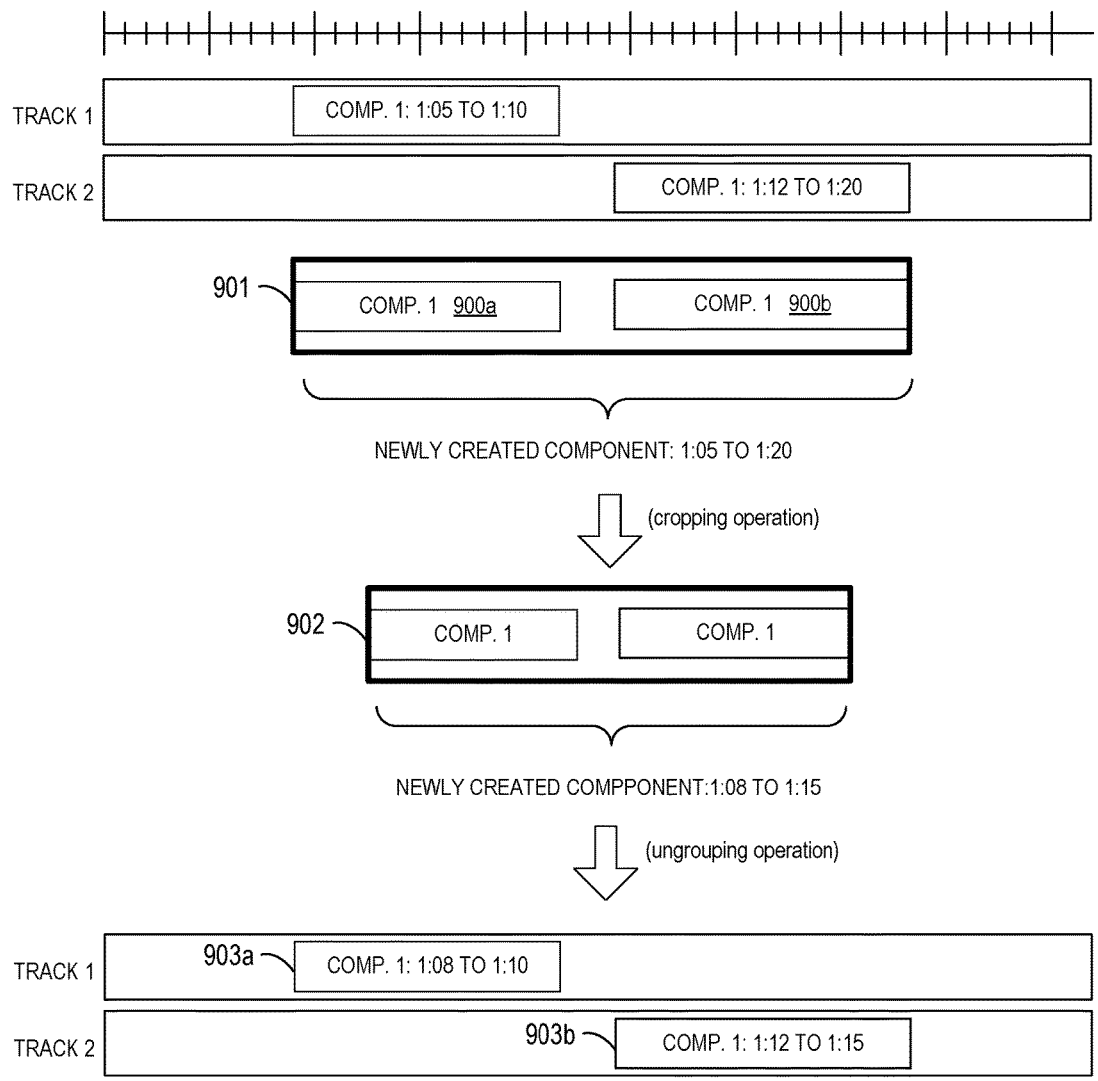
FIG. 9 illustrates an ungrouping operation performed on a newly created component comprising two components in accordance with various embodiments.

To illustrate, reference is made to FIG. 9, which illustrates an ungrouping operation performed on a newly created component 901 comprising two sub-components. In the illustration shown, component 1 from track 1 and component 2 from track 2 have been grouped together to form a newly created component 901, which spans the start time of component 1 in track 1 and the end time of component 1 in track 2 (1:05 to 1:20). Suppose for purposes of illustration that a trimming operation or a cropping operation is performed on component 901 to generate a new component 902 such that the new component 902 is shorter than component 901 and spans 1:08 to 1:15.

Note that a trimming operation is distinguished from a cropping operation. With a trimming operation, the length/duration of the component is reduced, whereas with a cropping operation, both the resolution and the length/duration of the component are reduced. (Nonetheless, both operations achieve the desired effect of shortening a given component.) Suppose that the user then elects to apply an ungrouping operation to separate the newly created component 902 back into the sub-components 903*a*, 903*b*, thereby allowing the user to perform further editing operations on only one of the sub-components 903*a*, 903*b*. In this regard, the ungrouping operation illustrated in FIG. 9 may be useful in providing the user with more control during the editing process. In the example shown in FIG. 9, suppose that the sub-components 900*a*, 900*b* were edited in a grouped state (i.e., through the use of batch editing). If user then wishes to perform further editing on only one of the sub-components 903*a*, 903*b*, the user may utilize the ungrouping operation described above in order to access the sub-components 903*a*, 903*b* separately.

As the media track manager 114 has preserved the original timing information associated with the components, the media track manager 114 is able to partition the newly created component 902 into two new sub-components 903*a*, 903*b*, where each new sub-component 903*a*, 903*b* can then be modified (e.g., trimmed or cropped) separately. For example, the user may wish to perform fine tuning of the trimming operation, where another 1 second is trimmed from sub-component 903*a* while another 2 seconds is trimmed from sub-component 903*b*. The edited sub-components 903*a*, 903*b* can then be recombined, relocated, etc. according to the reorganization techniques disclosed above. In this regard, generating one or more additional tracks can comprise generating a modified track by applying a media effect to a track among the selected tracks, receiving user input to ungroup components in the modified track, generating a new track for the components to be ungrouped, and relocating the components to be ungrouped to a corresponding new track.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a media editing device for reorganizing media content and editing the reorganized media content, comprising:

obtaining a plurality of tracks and displaying the plurality of tracks starting with a highest ordered track at the top to a lowest ordered track at the bottom, each track comprising at least one component, each component comprising at least one segment, each segment comprising one of: image content, video content, audio content, and audio/video content;

receiving a first user input selecting a plurality of the tracks;

receiving a second user input selecting at least one reorganization technique to be applied to the selected tracks;

applying a first selected reorganization technique to the selected tracks, wherein the first reorganization technique specified by the second user input identifies one or more available time slots in a higher ordered track and automatically moves components located in one or more same time slots from a lower ordered track to the higher ordered track;

displaying the reorganized tracks; and receiving editing operations and applying the editing operations to all of the reorganized selected tracks.

2. The method of claim 1, further comprising prompting the user to specify at least one reorganization technique in response to a number of tracks specified in the first input exceeding a predetermined number of tracks.

3. The method of claim 1, further comprising prompting the user to specify at least one reorganization technique in response to a number of components located in the selected tracks specified in the first input exceeding a predetermined number of components.

4. The method of claim 1, wherein a second reorganization technique specified by the second user input comprises one of: reordering the selected tracks, merging the selected tracks, and generating additional tracks.

5. The method of claim 4, wherein reordering the selected tracks comprises generating a list of sorted selected tracks, the list sorting the selected tracks according to a number of components in each track, and wherein the tracks are rearranged and displayed according to the list of sorted selected tracks.

6. The method of claim 5, wherein a track with the highest number of components is at the top of the list of sorted selected tracks.

7. The method of claim 4, wherein merging the selected tracks comprises: receiving a third user input selecting components within the selected tracks to be merged; identifying available time slots in a track among tracks containing the selected components; combining the selected components, wherein the combined selected components are relocated to the track with the available time slots.

8. The method of claim 7, wherein upon combining the selected components and relocating the combined selected components to the track with the available time slots, and wherein any tracks with no remaining components after relocation of the combined selected components are removed.

9. The method of claim 4, wherein generating the additional tracks comprises: generating a modified track by applying a media effect to a track among the selected tracks; receiving user input to ungroup components in the modified track; generating a new track for the components to be ungrouped; and relocating the components to be ungrouped to a corresponding new track.

10. A system, comprising:
a memory storing instructions; and
a processor coupled to the memory and configured by the instructions to at least:
obtain a plurality of tracks and display the plurality of tracks starting with a highest ordered track at the top to a lowest ordered track at the bottom, each track comprising at least one component, each component comprising at least one segment, each segment comprising one of: image content, video content, audio content, and audio/video content;
receive a first user input selecting a plurality of the tracks;
receive a second user input selecting at least one reorganization technique to be applied to the selected tracks;
apply a first selected reorganization technique to the selected tracks wherein the first reorganization technique specified by the second user input identifies one or more available time slots in a higher ordered track and automatically moves components located in one or more same time slots from a lower ordered track to the higher ordered track;
display the reorganized tracks; and
receive editing operations and apply the editing operations to all of the reorganized selected tracks.

11. The system of claim 10, wherein a second reorganization technique specified by the second user input comprises one of: reordering the selected tracks, merging the selected tracks, and generating additional tracks.

12. The system of claim 11, wherein reordering the selected tracks comprises generating a list of sorted selected tracks, the list sorting the selected tracks according to a number of components in each track, and wherein the tracks are rearranged and displayed according to the list of sorted selected tracks.

13. The system of claim 12, wherein a track with the highest number of components is at the top of the list of sorted selected tracks.

14. The system of claim 11, wherein merging the selected tracks comprises: receiving a third user input selecting components within the selected tracks to be merged; identifying available time slots in a track among tracks containing the selected components; combining the selected components, wherein the combined selected components are relocated to the track with the available time slots.

15. The system of claim 14, wherein upon combining the selected components and relocating the combined selected components to the track with the available time slots, and wherein any tracks with no remaining components after relocation of the combined selected components are removed.

16. The system of claim 11, wherein generating the additional tracks comprises: generating a modified track by applying a media effect to a track among the selected tracks; receiving user input to ungroup components in the modified track; generating a new track for the components to be ungrouped; and relocating the components to be ungrouped to a corresponding new track.

17. A non-transitory computer-readable storage medium storing instructions to be implemented by a computing device having a processor, wherein the instructions, when executed by the processor, cause the computing device to at least:
obtain a plurality of tracks and display the plurality of tracks starting with a highest ordered track at the top to a lowest ordered track at the bottom, each track comprising at least one component, each component comprising at least one segment, each segment comprising one of: image content, video content, audio content, and audio/video content;
receive a first user input selecting a plurality of the tracks;
receive a second user input selecting at least one reorganization technique to be applied to the selected tracks;
apply a first selected reorganization technique to the selected tracks, wherein the first reorganization technique specified by the second user input identifies one or more available time slots in a higher ordered track and automatically moves components located in one or more same time slots from a lower ordered track to the higher ordered track;
display the reorganized tracks; and
receive editing operations and apply the editing operations to all of the reorganized selected tracks.

18. The non-transitory computer-readable storage medium of claim 17, wherein a second reorganization technique specified by the second user input comprises one of:

reordering the selected tracks, merging the selected tracks, and generating additional tracks.

19. The non-transitory computer-readable storage medium of claim 18, wherein reordering the selected tracks comprises generating a list of sorted selected tracks, the list sorting the selected tracks according to a number of components in each track, and wherein the tracks are rearranged and displayed according to the list of sorted selected tracks.

20. The non-transitory computer-readable storage medium of claim 18, wherein merging the selected tracks comprises: receiving a third user input selecting components within the selected tracks to be merged; identifying available time slots in a track among tracks containing the selected components; combining the selected components, wherein the combined selected components are relocated to the track with the available time slots.

21. The non-transitory computer-readable storage medium of claim 18, wherein generating the additional tracks comprises: generating a modified track by applying a media effect to a track among the selected tracks; receiving user input to ungroup components in the modified track; generating a new track for each of the components to be ungrouped; and relocating each of the components to be ungrouped to a corresponding new track.

\* \* \* \* \*